United States Patent [19]
Larsen et al.

[11] Patent Number: 5,881,974
[45] Date of Patent: Mar. 16, 1999

[54] METHOD FOR RESETTING A TIMER AND A TIMER ESPECIALLY FOR USE IN CONNECTION WITH AN ITEM DESCENDING FROM A FLYING OBJECT

[75] Inventors: Mads Larsen, Kirke Hyllinge; Niels Brusgaard, Vipperød, both of Denmark

[73] Assignee: Larsen & Brusgaard APS, Roskilde, Denmark

[21] Appl. No.: 796,184

[22] Filed: Feb. 7, 1997

[51] Int. Cl.[6] .................................................. F64D 17/54
[52] U.S. Cl. ........................................ 244/149; 244/150
[58] Field of Search .................................. 244/1 R, 149, 244/150, 152, 137.1, 137.4; 102/206, 211

[56] References Cited

U.S. PATENT DOCUMENTS

| | | | |
|---|---|---|---|
| 2,525,608 | 10/1950 | Kuntz | 244/150 |
| 3,547,383 | 12/1970 | Carpenter | 244/150 |
| 3,690,605 | 9/1972 | Jones | 244/149 |
| 3,787,011 | 1/1974 | Phillips et al. | 244/150 |
| 3,813,066 | 5/1974 | Raznov | 244/150 |
| 4,783,027 | 11/1988 | Jones . | |
| 4,858,456 | 8/1989 | Cloth | 244/149 |

FOREIGN PATENT DOCUMENTS 0 480 7 33 B1  4/1992  European Pat. Off. .

*Primary Examiner*—Charles T. Jordan
*Assistant Examiner*—Charles R. Ducker, Jr.
*Attorney, Agent, or Firm*—Finnegan, Henderson, Farabow, Garrett & Dunner, L.L.P.

[57] ABSTRACT

A method for automatic resetting of a timer according to the exit time when an item starts descending from a flying object. The resetting is based on a number of altitude values, which are continuously measured by performing air pressure measurements or position measurements. Furthermore, a microprocessor based apparatus implementing said method is described. The timer can be used for activating an external mechanical or electrical apparatus e.g. a canopy or an audible warning device.

18 Claims, 9 Drawing Sheets

METHOD FOR RESETTING A TIMER AND A TIMER ESPECIALLY FOR USE IN CONNECTION WITH AN ITEM DESCENDING FROM A FLYING OBJECT

TECHNICAL FIELD OF THE INVENTION

This invention relates to determining the exit time when an item starts descending from a flying object. The exit time is used for resetting a timer following the item. The timer according to the invention is usable both as a security means as well as a clock for parachutist competition.

BACKGROUND OF THE INVENTION

Prior art devices designed to activate an acoustic signal, a canopy opening mechanism or other operators are all based on the principle of activating the device when a certain barometric air pressure and/or air speed has occurred or after a preset elapsed time after a mechanical or electrical chronometer has been activated manually, see e.g. EP 48 07 33 and US 47 83 027.

None of the prior art devices are able to determine the exit time automatically, which could otherwise enhance the safe function of such devices and further contribute to presenting better information, preferably audible, to the parachutist when descending.

SUMMARY OF THE INVENTION

In accordance with the invention, a method is described for resetting a timer according to the exit time when an item starts descending from a flying object, comprising steps of continuously measuring and storing the values of the altitude of the time, determining within a first and a second time interval the slope of respective first and second curve fractions, each curve fraction being defined by the measured altitude versus time, continuously detecting the difference in slope values of the two first fractions, and choosing the exit time according to the time when the difference between said slopes exceeds a predetermined value.

This is a new and very effective method for establishing the exit time, whereby acoustic alarm can be given to the parachutist when the predetermined time has elapsed either for releasing the parachute and/or just for indicating that a preset time has elapsed since exit time. The last mentioned information is very useful for a parachutist taking part in a parachute jump competition which will be judged a certain number of seconds after exit time. The feature has not been obtained earlier.

The altitude is measured e.g. by means of the air pressure or by means of other position detection means so as to provide a table corresponding to an imaginary curve showing the altitude versus elapsed time. The slope of this curve will be more or less horizontal as long as the parachutist will be in the air craft, but after exit time this curve will show a quite different slope. The exit time is defined to correspond to a characteristic change in said slopes.

It will be expected that the measurements of altitude will be affected by noise, and preferably the invention also comprises means for compensating for any inaccuracies so that a very reliable determination of the exit time is obtained.

In one embodiment the measured values are low-pass filtered before the slope of fractions of the said curve is calculated, and in another embodiment the exit time is continuously verified by comparing the difference in slope values of the first curve fractions and the slope of a third curve fraction of altitude versus time defined within a third time interval which progresses according to real time.

Further, the reliability can be enhanced by continuously verifying the exit time by supervision of the imaginary intersection of the first curve fraction and a third curve fraction of altitude versus time defined within a third time interval which progresses according to the real time.

The invention also comprises a timer for use in connection with an item descending from a flying object and comprising means for registering the time elapsed since exit time when the item starts descending, detection means for measuring the altitude, storage means for storing the values of the altitude, means for calculating within a first time interval the slope of a first curve fraction defined as altitude versus time, and means for calculating within a second time interval the slope of a second curve fraction defined as altitude versus time, and means for finding and showing the intersection point between said curve fractions or their extensions, said intersection point defining the exit time.

Various embodiments of the timer are arranged to accomplish the methods mentioned above and will be described more clearly in the following description.

DESCRIPTION OF THE PREFERRED EMBODIMENT

Figure 1:
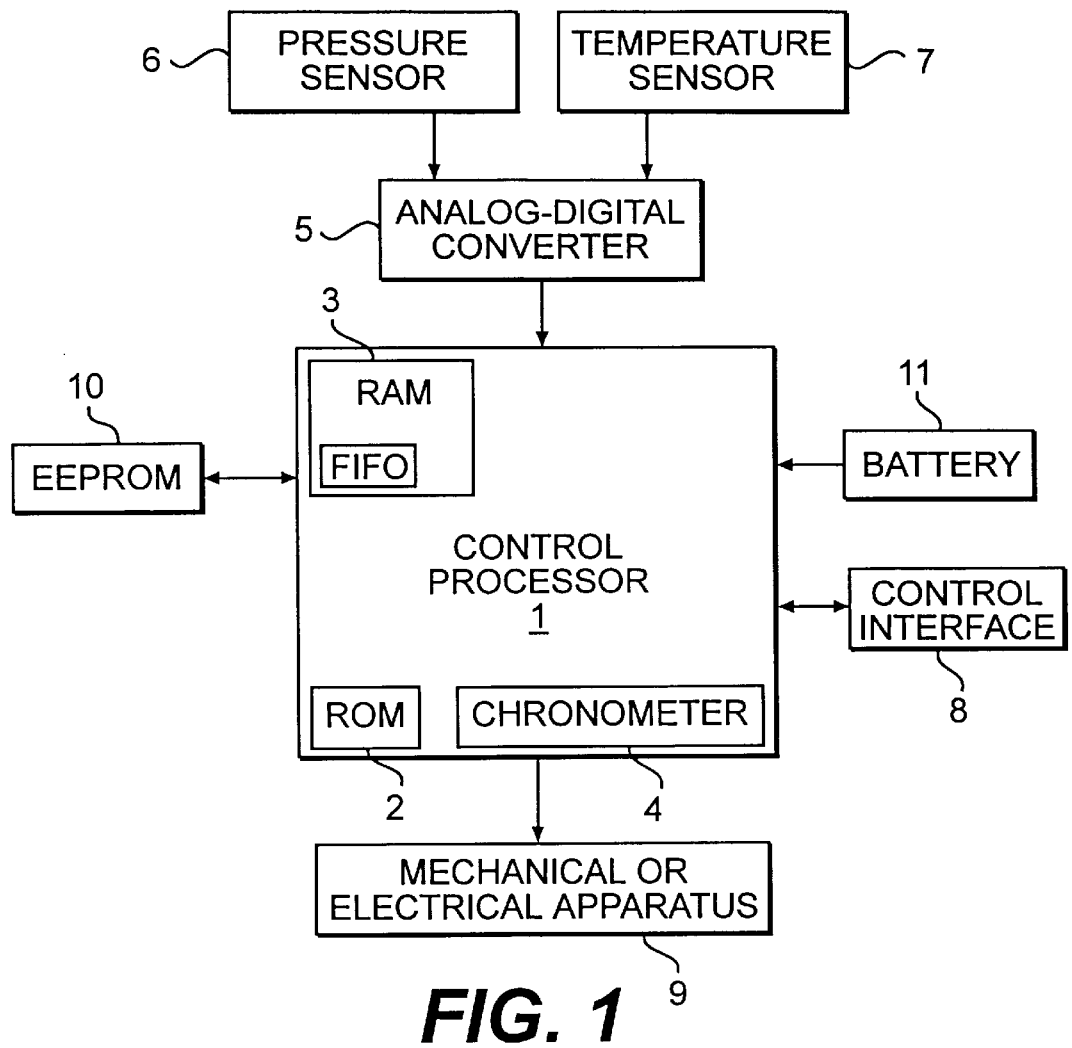
FIG. 1 is an architecture model of the apparatus in accordance with the present invention.

FIG. 1 is an architecture model of the apparatus in accordance with the present invention. The apparatus consists of a control processor 1, which is powered by means of a battery 11. The control processor 1 is connected to a control interface 8, to an EEPROM 10, to an analog-digital converter 5, and to a mechanical or electrical apparatus 9. The analog-digital converter 5 is connected to a pressure sensor 6 and to a temperature sensor 7. The control processor 1 includes a ROM 2, a RAM 3 and a chronometer 4.

the ROM 2 holds the program used for operating the device according to the following functional description, whereas the RAM 3 is used to store various temporary data. The EEPROM 10 holds an adjustable fixed value memory containing presettable comparative and correction values for the chronometer 4. The control interface 8 is used to interface with the user of the apparatus, enabling the user to specify the chronometer data which are stored in the EEPROM.

The control processor 1 controls the sampling of measurements of the air pressure and the temperature using the pressure sensor 6 and the temperature sensor 7. The analog-digital converter 5 feeds the electrical signals from the pressure sensor 6 and the temperature sensor 7 to the control processor in digital form. The measured air pressure and temperature values are stored in the RAM 3.

Based on the air pressure and preferably also on the temperature measurements, the control processor determines whether the item has started descending from the flying object. How the determination is performed in detail is described in the following with reference to the flow chart in FIG. 2A and FIG. 3A. When the start of the descent from the flying object has been detected, the chronometer 4 is started and the mechanical or electrical apparatus 9 is trigged when a preset time is reached.

The basic idea of the exit time detection function is to perform an automatic detection of the exit time when an item has left a flying object. The detection is performed by continuous determination of the intersection point between two curves in the altitude vs. time space. Based on difference in slopes of the lines, it is determined whether the intersection point can be regarded as the exit time and exit altitude of the item.

Figure 2B:
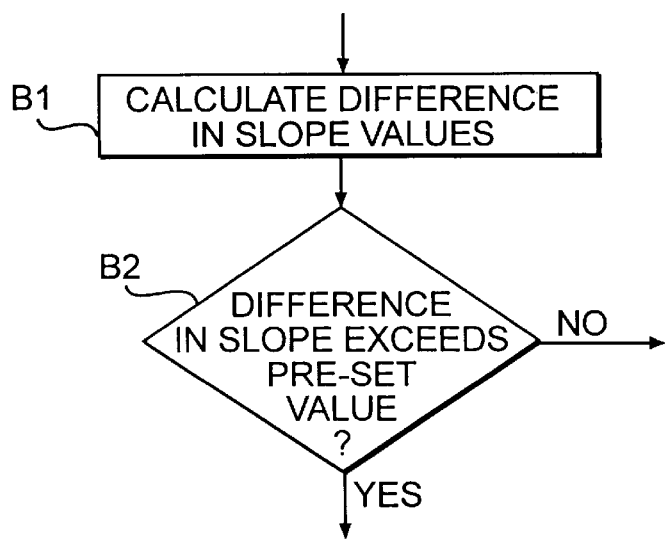
FIGS. 2B and 3B is a flow chart illustrating how the decision to start the timer is performed in FIGS. 2A and 3A in accordance with the present invention.
Figure 2A:
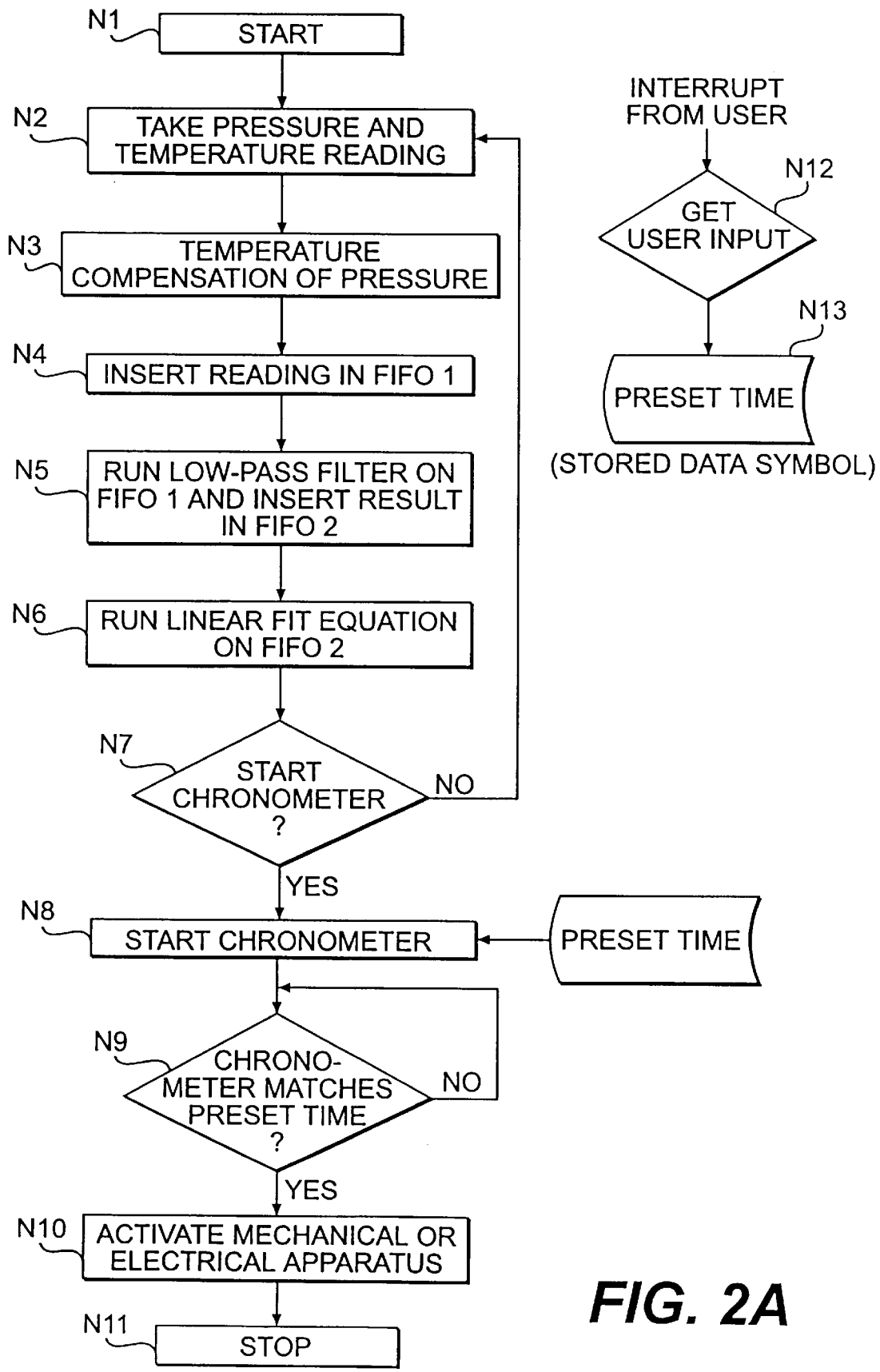
FIG. 2A is a flow chart illustrating a first embodiment in accordance with the present invention.

FIG. 2A illustrates the function of a first embodiment of the apparatus. When the apparatus is turned on, it operates as indicated in the flow chart. Initially, the device is in the start state, step N1. The device determines the altitude by measuring the air pressure, step N2. It is noted that the altitude determination could also have been performed by using a position measurement e.g. using GPS satellite navigation. In order to compensate for the effect of the temperature on the altitude measurement a temperature is preferably also measured, step N2. In step N3 the measured altitude is corrected in order to eliminate the effect caused by the influence of the temperature. The compensation of the temperature influence will not be described in detail, as it is well known, and as it is of minor importance in relation to the present invention.

The adjusted altitude measurement is then placed in a first FIFO (first-in-first-out) buffer located in the RAM, see FIG. 1, as illustrated in step N4. The FIFO buffer contains a number of previous altitude measurements, e.g. 100 values.

In order to disregard noise and to enhance the reliability the measured data are preprocessed using a low-pass filter, step N5, in this embodiment. Based on a number of measured altitude values from the first FIFO buffer, a low-pass filtered altitude value is determined and placed in a second FIFO buffer, step N5.

Based on the low-pass filtered altitude values placed in the second FIFO buffer, it is decided whether the timer, i.e. the chronometer, is to be started. It is noted that 'chronometer' and 'timer' are used synonymously in the following description. The decision is based on a new principle which determines whether the device has left the flying object, i.e. the free fall is started.

The principle according to the invention approximates two curve fractions to match the measured points in the altitude vs. time space as well as possible, step N6. The curve fractions used in the preferred embodiment are straight lines, and they are found using e.g. linear regression. The lines are found using the measured altitudes stored in the FIFO buffers located in the RAM. It is noted that the measuring time information is known as the sample frequency is known. As a consequence the measuring time information is not saved in RAM. It is noted that, naturally, the time values could have been saved in another FIFO buffer, but this solution is not used in the preferred embodiment in order to reduce the amount of RAM space used. The measured data, i.e. the altitudes and the corresponding measuring times, can be regarded as a number of points in the altitude vs. time space, see FIGS. 4, 5 and 6. Using these points, the two lines are determined in the following way.

Figure 6A:
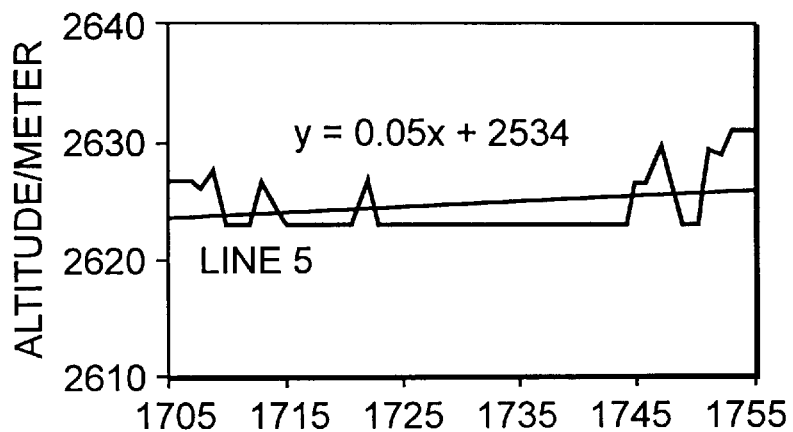
FIG. 6A–F illustrates the determination of the exit time in accordance with the present invention.
Figure 6B:
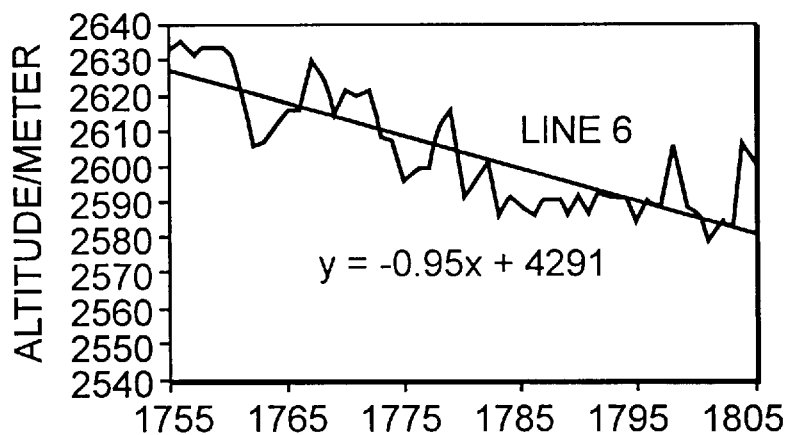

The first half of the FIFO buffer values (the oldest buffer values) used to determine a first line (line no. 1, see FIG. 6A), and the second half of the FIFO buffer values (the newest buffer values) used to determine a second line (line no. 2, see FIG. 6B). Using said buffer values, i.e. points in the altitude vs. time space, a corresponding line approximates the points as well as possible using linear regression. Likewise the second line is found using the values from the second half of the FIFO buffer. The intersection point between the determined lines are found, and it is evaluated whether it is to be accepted as a possible exit point, i.e. whether it is likely that the item has left the flying object. This decision is based on the slopes of the two lines, as described in relation to FIG. 2B.

The intersection between said lines specifies the time to start the timer, i.e. the exit time when the item started the descent from the flying object, if a number of conditions is fulfilled. The intersection point also contains information on the altitude corresponding to the time of interest. A more exact description of the method follows. It is noted that the corresponding exit time and exit altitude are called an exit point in the following, as they specify a point in the altitude vs. time space.

It should be noted that straight lines are used due to the simplicity, but other curves can be used as well, e.g. another polynomial could be approximated to the points specified by the two halves of the FIFO buffer, and the intersection between the approximated curve fraction would then specify the exit time.

Based on the above-mentioned function, the decision of whether to start the timer or not, i.e. whether the item has left the flying object or not, is made. If it is concluded that the item has not left the flying object, the timer is not started and a new measurement of the altitude and the temperature is performed as indicated in step N2. The measurement is followed by the steps N3, N4, N5, N6 and N7, as described above. If, of the other hand, it is concluded that the item has left the flying object, the timer is started as indicated in step N8. Before the timer is started, it is initialized using the preset time information specified by the user as indicated in relation to step N8. As the detection of the exit time is time delayed in relation to the detected exit time, the initial timer value is adjusted in order to compensate for the time delay, i.e. the adjustment results in a start of the timer corresponding to detected exit time.

In step N9 the timer continuously compares the elapsed time since the start of the timer with the time specified by the user. When the timer reaches the user specified value, an apparatus is activated, step N10. The apparatus can be a mechanical as well as an electrical device, e.g. an alarm or a parachute. The timer uses the user specified preset time saved in the EEPROM. As indicated by the steps N12 and S11, the user can specify the parameters for presetting the time.

FIG. 2B describes how the decision whether to start the timer is made, i.e. a detailed description of step N7 in FIG. 2A. In step B1 the difference in slope values between the lines approximating the two halves of the FIFO buffer, which were found in step N6 in FIG. 2A, is calculated. In step B2 the calculated difference in slope values is compared with a predeterminated value. If the difference in slop values exceeds a given value, e.g. 8.0 meters/second, the intersection point is accepted as being the exit point. On the other hand, if the difference in slope values does not exceed the given value, the intersection point is rejected as corresponding to an exit time of an item descending from a flying object.

Figure 3A:
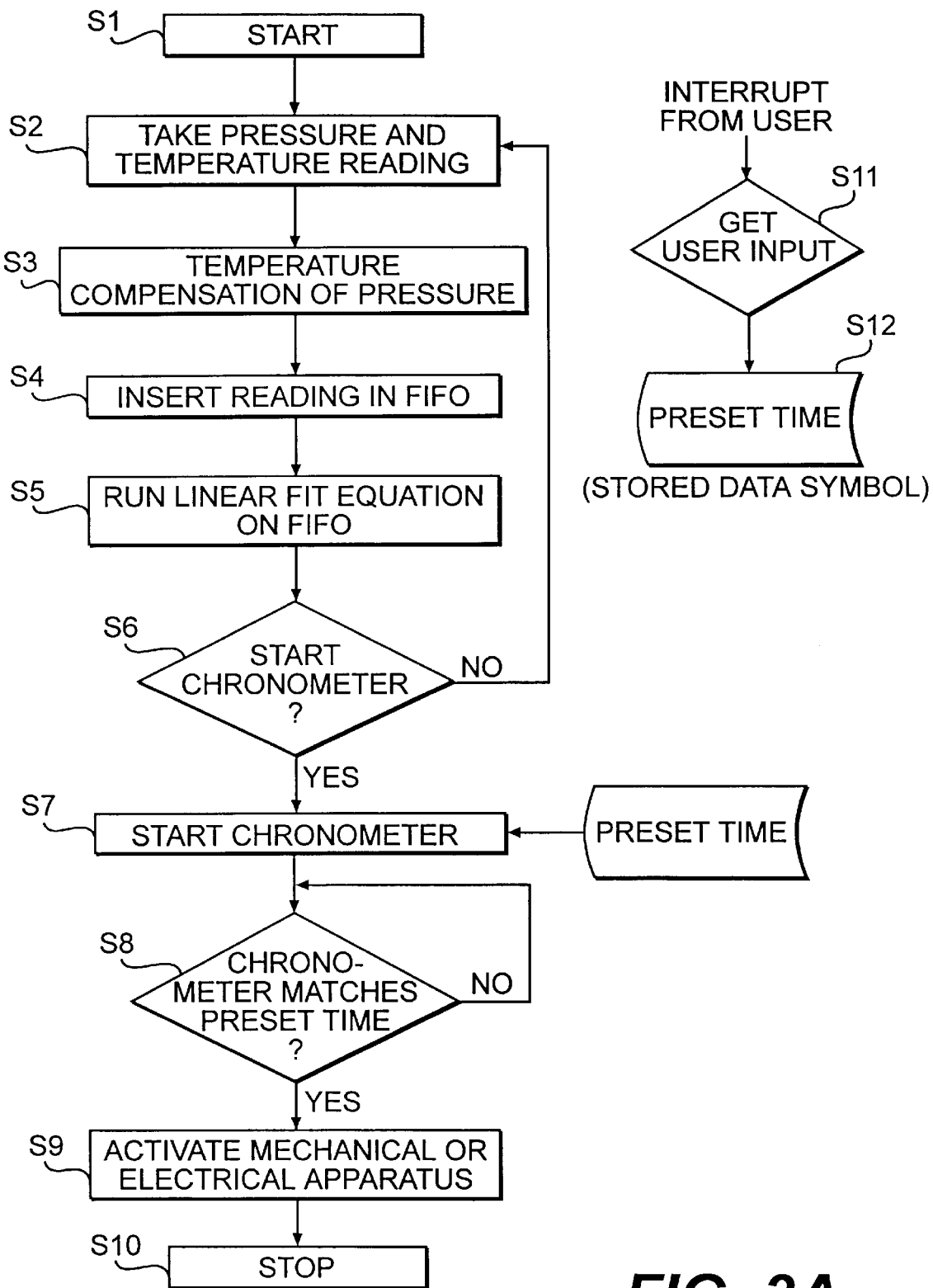
FIG. 3A is a flow chart illustrating another embodiment in accordance with the present invention.

FIG. 3A illustrates the function of another embodiment of the apparatus. Like in the previous description, the device is activated in a start state, step S1. As indicated in step S2, S3 and S4, the device determines the altitude, uses a temperature measurement to compensate for the influence of the temperature on the altitude measurement, and places the resulting compensated altitude measurement in a FIFO buffer located in the RAM. In contrast to the method illustrated in FIG. 2A, the measured data need not be preprocessed using a low-pass filter. The contents of this FIFO buffer are used in the process of detecting the exit time, by approximating a first line to the first half of the FIFO buffer values and a second line to the second half of the FIFO buffer, using linear regression. Based on the lines determined in step S5 the decision whether to start the timer is made. An alternative embodiment for enhancing the reliability is described in detail in relation to FIG. 3B. If it is concluded not to start the timer, a new pressure and temperature measurement is performed, step S2, followed by the steps S3, S4, S5 and S6 as discussed above. If, on the other hand, it is decided to start the timer, the timer is started, step S7. The timer value is continuously evaluated, step S8, and a mechanical or electrical apparatus is activated, step S9, when the timer reaches the user-specified timer value.

The second embodiment, described above, uses the measured data in the detection of the exit time, without preprocessing of the data being needed, and in order to ensure that a fail-safe determination of the exit time is performed, the detection of the exit time is supplemented by a verification process.

Figure 3B:
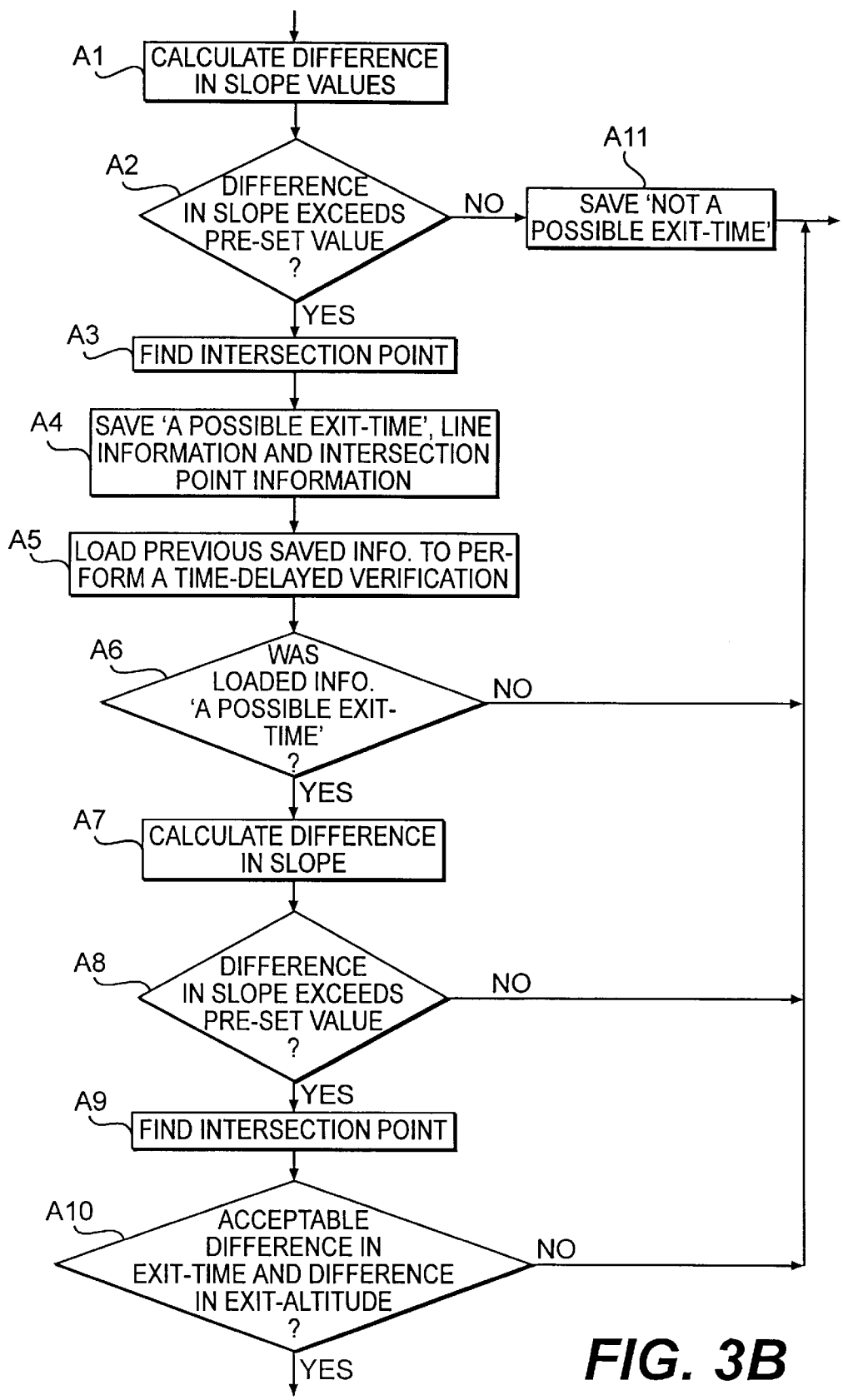

FIG. 3B describes how the decision whether to start the timer is made, i.e. a detailed description of step S6 in FIG. 3A, and how said verification is performed. In step A1 the difference in slope values between the two lines, found by the linear regression in step S5 in FIG. 3A, is calculated. In step A2 the difference in slope values is compared with a predeterminated value in order to decide whether the intersection point is to be regarded as a possible exit point. If the difference in slope values exceeds the predeterminated value, the intersection point between said curves is calculated, step A3. The information 'a possible exit time' is saved in a buffer located in RAM, step A4, otherwise the information 'not a possible exit time' is saved in a buffer located in the RAM, step A11. In step A4, the information specifying the line approximating the left half of the FIFO buffer values and the intersection point between said two lines are also saved in the RAM. In order to perform a verification of a previously found possible exit time, the saved information related to the point of concern, e.g. a possible exit time detected 1–2 seconds earlier, is loaded from the RAM, step A5. It is checked whether the loaded data correspond to 'a possible exit time', step A6. If the answer is in the affirmative, the validation is performed in step A7–A10, otherwise it is determined that the loaded data do not correspond to 'a possible exit time'. The validation of the exit point is performed in two steps. Firstly the difference in slope values between the line approximating the first half of the FIFO buffer values and the loaded line approximating the first half of the old FIFO buffer values are calculated, step A7. The calculated difference is compared to the predeterminated value in step A8. If the calculated difference exceeds the predeterminated value, the second part of the validation is performed, step A9–A10. Otherwise the loaded possible exit point is rejected as being an actual exit point. In step A9 the intersection point between said lines, i.e. the line corresponding to the first half of the FIFO buffer values and the line corresponding to the first half of the old FIFO buffer values, is calculated. In step A10 the intersection point is compared with the loaded intersection point. If the difference in exit time and exit altitude is less than the predeterminated values, the possible exit point is accepted as being the actual exit point, otherwise it is rejected.

The basic idea in the preferred embodiment described above is as follows. The detection of the exit time is performed by continuous determination of the intersection point between two lines in the altitude vs. time space. Based on difference in slopes of the lines, it is determined whether the intersection point can be regarded as a possible exit time and exit altitude of the item, i.e. a possible exit point. If the answer is in the affirmative, a following time delayed verification is performed in order to determine whether the possible exit point is to be accepted as being the actual exit point. If the possible exit point are verified, the timer is started using the information of the elapsed time since the detection of the exit time. As mentioned above, the intersection between two lines in the altitude vs. time space is used as a possible exit point of an item starting its descent from a flying object. After a predetermined time interval, e.g. 1–2 seconds, the previous intersection point, which was found to be a possible exit point, is evaluated in order to determine whether it is to be accepted as an exit point, or whether it is to be rejected. In order to increase the reliability of the result, the evaluation is performed in regard to time, altitude and a difference in slope values, even though one of the mentioned evaluations is sufficient.

The contents of the second half of the FIFO buffer (newest buffer values) are used to find a line (line no. 3) which approximates the points as well as possible using linear regression. Like before, the first part of the evaluation consists of an evaluation of difference in slope values between the slope of line no. 1, corresponding to the first half of the FIFO buffer used in the previously mentioned evaluation of the point in question, and the slop line no. 3, corresponding to the second half of the present FIFO buffer values. If the difference in slope values exceeds the predetermined value, the exit point is still considered to be a possible exit point, otherwise the point is rejected. If the first condition is fulfilled, the second part of the evaluation is performed. In this evaluation, the intersection point between line no. 3 and line no. 1 and the intersection point between line no. 1 and line no. 2 are compared. A predetermined maximum difference in time and altitude is acceptable, e.g. 0.5 second and 1.0 meter. If the difference in time and altitude between the two intersection points does not exceed the predetermined values, the possible exit time is accepted as being the actual exit time, and the timer is started. Otherwise, the possible exit time is rejected, and the timer is not started. It should be noted that even though a single verification is performed, it might also be of interest to perform a larger number of evaluations, and these could be performed like the single verification mentioned above, i.e. based on a difference in slope values and preferably supplemented by a time and an altitude evaluation.

Figure 4:
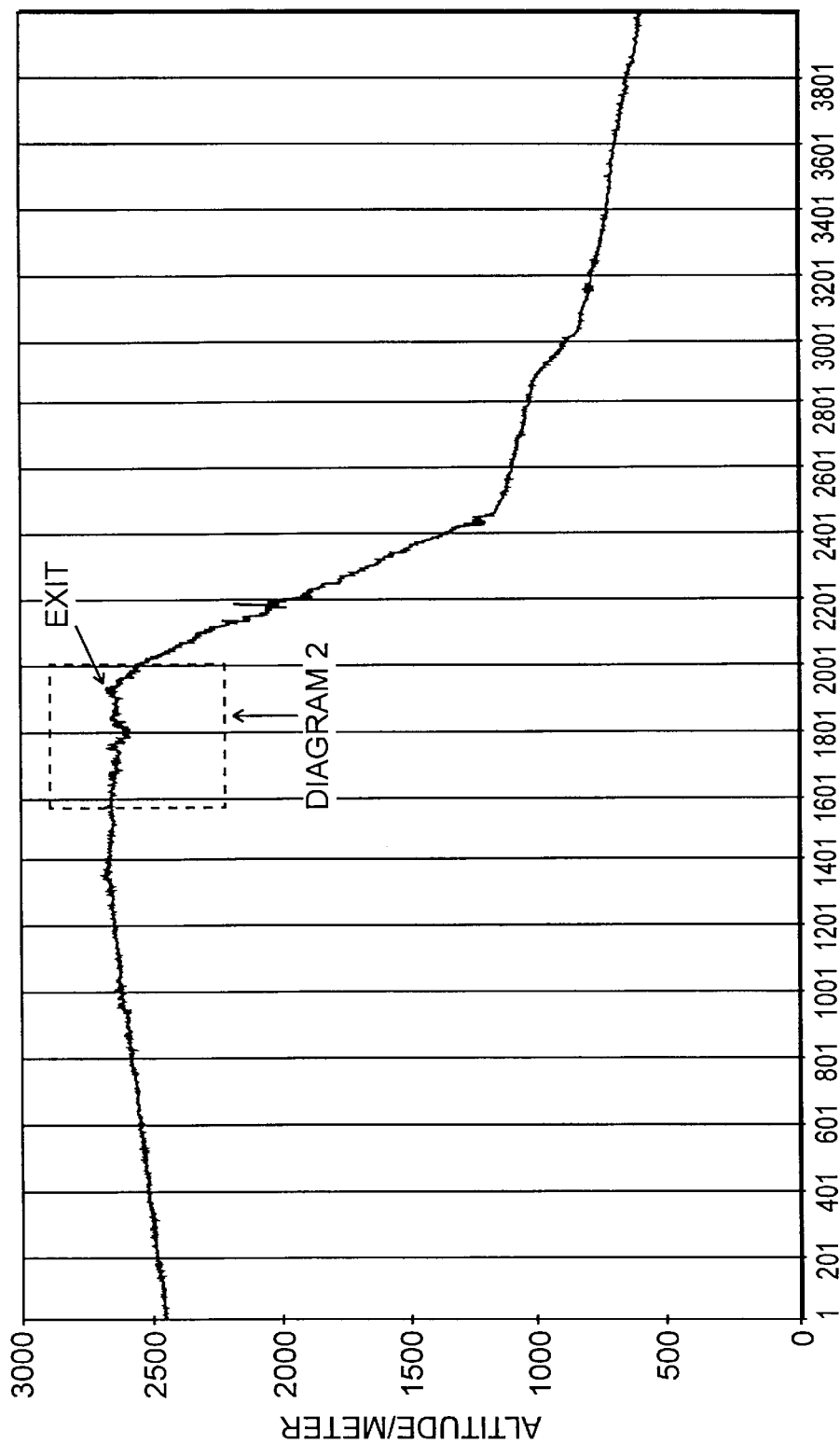
FIG. 4 is an example of measured data with altitude vs. time.

FIG. 4 is an example of measured data with altitude in meters vs. time in 0.1 seconds, showing the typical picture of a parachutist exiting from a flying aircraft. The data are sampled with a frequency of 10 samples/second, but another sample frequency could be used if desired. The data shown are the measured data, that is the data have not been preprocessed. The section to the left, i.e. the section between sample no. 1 and approximately sample no. 1900 (the time interval between approx. 0.1 and 190.0 seconds), is almost horizontal and corresponds to the situation where the parachutist is still inside the flying aircraft, whereas the section to the right, i.e. above approximately 190.0 seconds, corresponds to the situation where the parachutist has left the flying aircraft. The parachutist performs a free fall at first, i.e. in the time interval between approximately 190.0 and approximately 240.0 seconds, followed by a release of the parachute and a following parachute descent in the time interval from approximately 240.0 seconds. In the following, the curve corresponding to the situation where the parachutist is still inside the flying aircraft, is called the flight curve, whereas the curve corresponding to the situation where the parachutist performs a free fall, is called the first fall curve.

The object of the invention is to determine the exit time, that is the intersection between the flight curve and the first fall curve. As described in relation to FIG. 5, the apparatus according to the invention determines the exit time to be 193.0 seconds, as indicated by the arrow in FIG. 4. The function is described in more detail in relation to FIG. 5.

Figure 5:
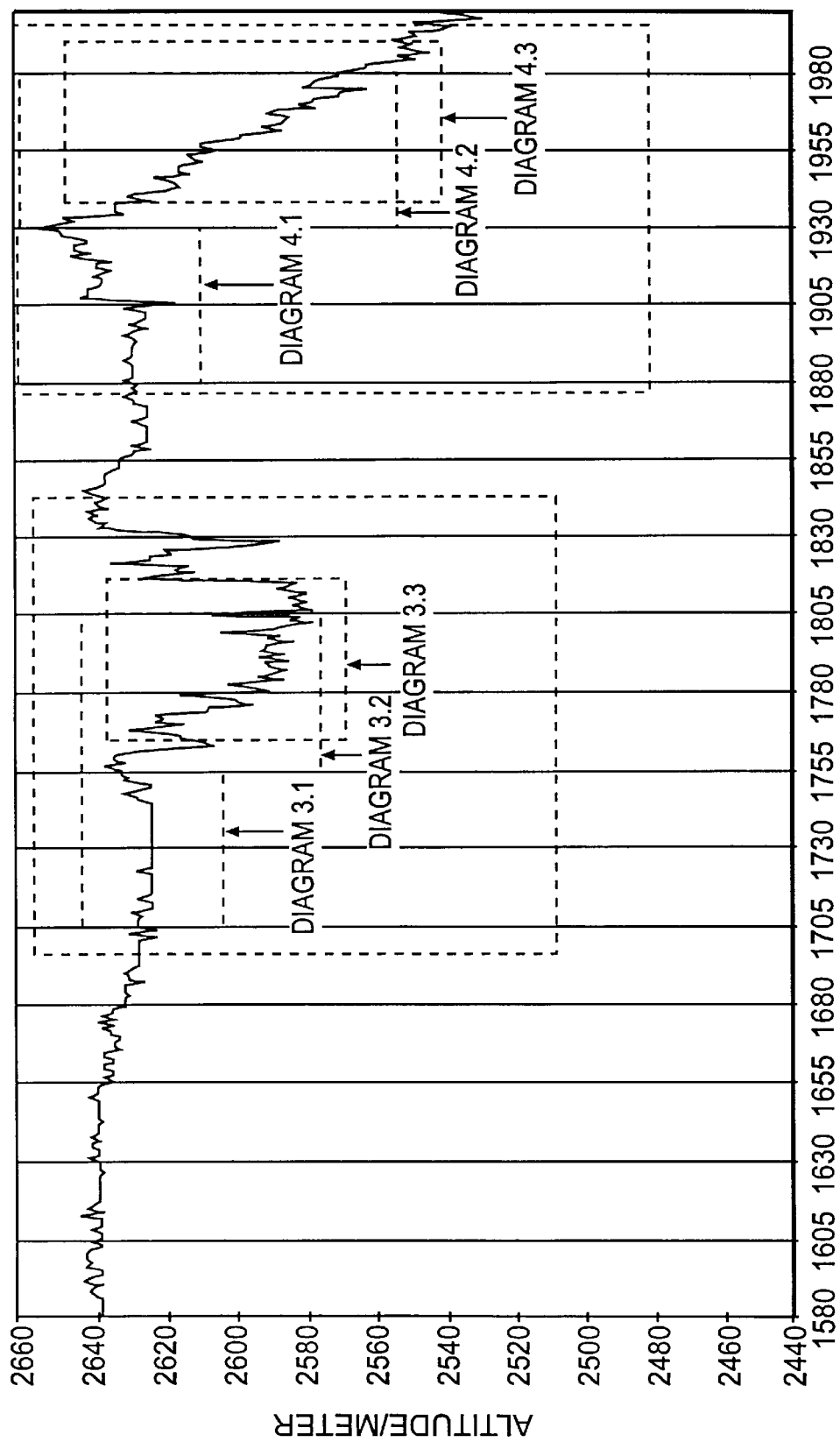
FIG. 5 is a zoom-in on the section marked 'Diagram 2' in FIG. 4.

FIG. 5 is a zoom-in on the section marked 'Diagram 2' in FIG. 4. A number of sections are marked in FIG. 5, and these will be used in the following description of the determination of the exit time.

Figure 6C:
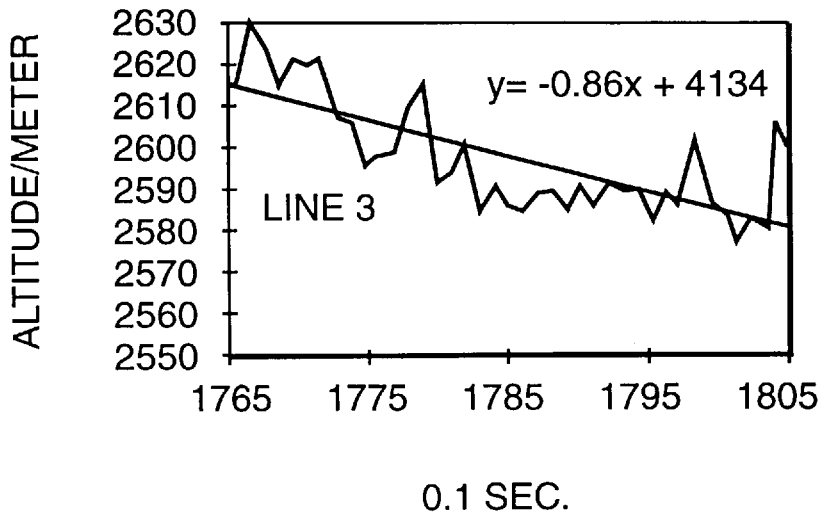

FIG. 6A–F is an illustration of the detection of the exit time in accordance with the present invention. FIG. 6A–C is a zoom-in on the sections marked 'Diagram 3.1', 'Diagram 3.2' and 'Diagram 3.3' in FIG. 5, and FIG. 6D–F is a zoom-in on the sections marked 'Diagram 4.1', 'Diagram 4.2' and 'Diagram 4.3' in FIG. 5.

Figure 6D:
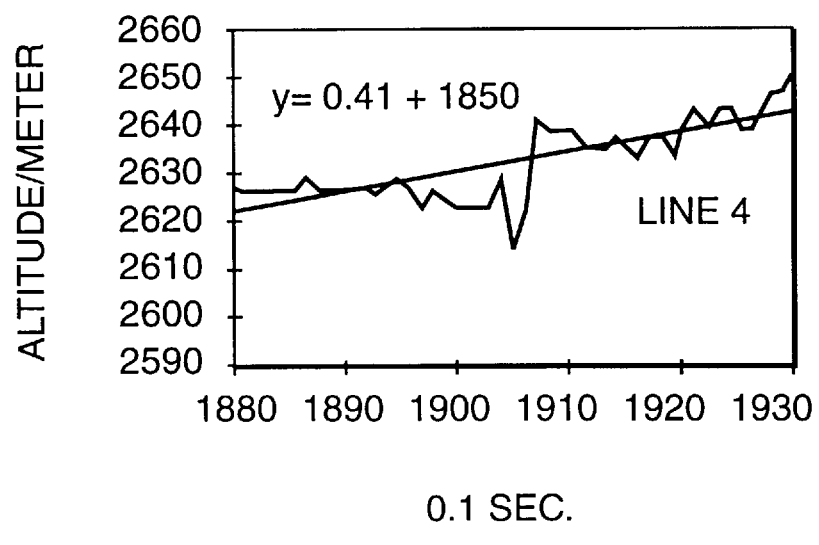
Figure 6E:
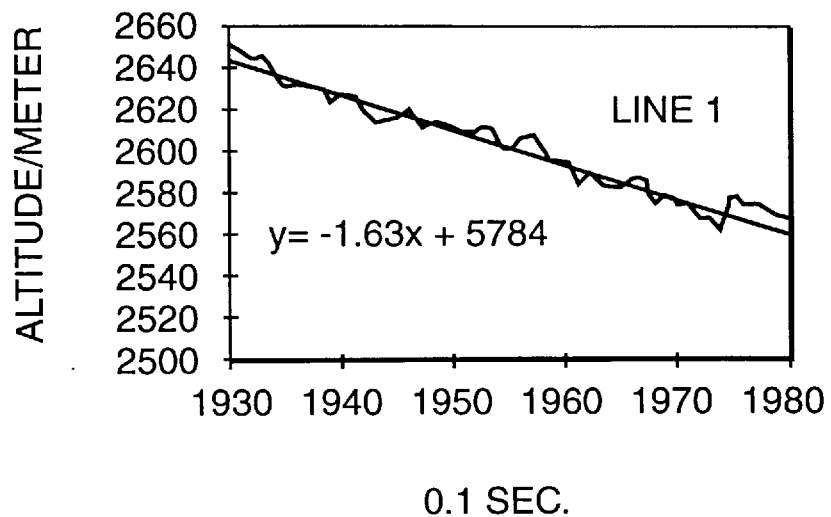
Figure 6F:
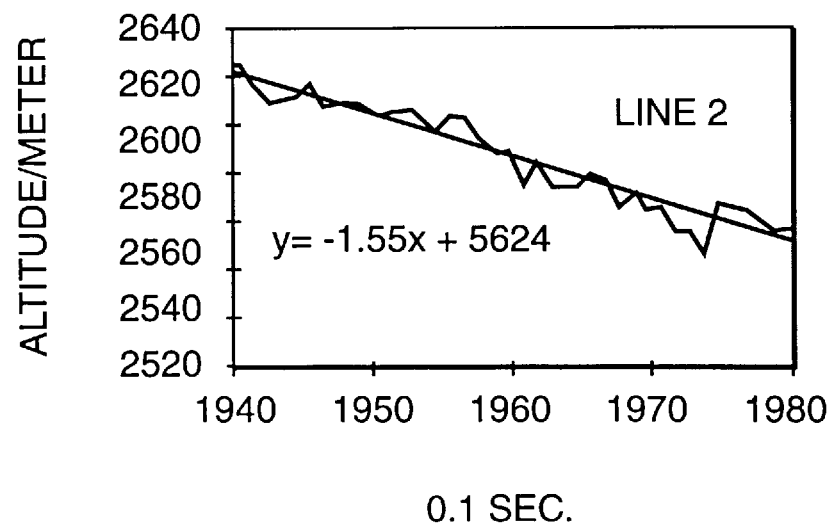

The data used in the examples shown in FIG. 6A–F are measured data that have not been preprocessed, and the detected exit time is therefore validated. The validation can be omitted if, as mentioned earlier, the data had been preprocessed. FIG. 6A–C illustrates a situation where a possible exit time is detected, but later rejected as a result of the verification, whereas FIG. 6D–F illustrates a situation where a possible exit time is detected and later accepted as being the actual exit time.

At time 180.5 seconds the FIFO buffer contains a number of values corresponding to the sections indicated by 'Diagram 3.1' and 'Diagram 3.2' in FIG. 5, i.e. the sections shown in FIG. 6A–B. As described previously, the buffer is split up into two subsections, where the first half corresponds to the section called 'Diagram 3.1' (FIG. 6A) and the second half corresponds to the section called 'Diagram 3.2' (FIG. 6B). As described earlier, the line corresponding to the best fit, using linear regression, is found in both sections, resulting in the following lines.

LINE 1: $y=0.05x+2534$
LINE 2: $y=-0.95x+4291$

The lines LINE 1 and LINE 2 are depicted in FIG. 6A–B. The difference in slope values, i.e. $0.05-(-0.95)=1.00$ that is 10.0 m/s, indicates that the point is evaluated as a possible exit point, where the parachutist may have exited the flying aircraft, as the criterion for acceptance is a difference in slope above 8.0 meters/sec. After 1 second the possible exit point is evaluated to verify that it is indeed an exit point. At this point in time the second half of the FIFO buffer contains the values corresponding to the section called 'Diagram 3.3' (FIG. 6C). In this case the following line is found to be the best fit using linear regression:

LINE 3: $y=-0.86x+4134$

The resulting line (LINE 3) is depicted in FIG. 6C. The difference in slope between LINE 1 and LINE 3 is found to be 9.1 m/s. The first validation condition is therefore fulfilled. The second condition is related to the difference between the intersection point between LINE 1 and LINE 2, and LINE 1 and LINE 3, respectively. The absolute time difference between the two intersection points is calculated to be 0.1 second, whereas the absolute difference in altitude is 6 meters. As the difference in altitude is larger than acceptable, the point in question is not accepted to be an exit point, and the timer is therefore not started.

Another situation is marked 'Diagram 4.1' and 'Diagram 4.2' in FIG. 5 corresponding to the contents of the FIFO buffer at the time 198.0 seconds. In this situation, the following lines are found to be the best fit of the point in the section 'Diagram 4.1' (FIG. 6D) and 'Diagram 4.2' (FIG. 6E) using linear regression:

LINE 4: $y=0.41x+1850$
LINE 5: $y=-1.63x+5784$

The resulting lines, LINE 4 and LINE 5, are depicted in FIG. 6D–E. The condition according to the difference in slope values is found to be fulfilled, as the difference in slope values (20.4 m/s) is greater than the value of 8.0 m/s which is the criterion of acceptance. This means that the point is accepted to be a possible exit point.

After 1 second the second half of the FIFO buffer contains the values corresponding to the section called 'Diagram 4.3' in FIG. 5. The following line is found to be the best fit of the points in this section using linear regression:

LINE 6: $y=-1.55x+5624$

LINE 6 is depicted in FIG. 6F. The difference in slope values between LINE 4 and LINE 6 is 19.6 m/s, that is the intersection between LINE 4 and LINE 5 is still accepted as being a possible exit point. The second relation related to the absolute difference between the two intersection points is found to be 0.1 seconds and 0.5 meters in this case. As this difference is sufficiently small to be accepted, the intersection point between LINE 1 and LINE 2, i.e. the possible exit point, is accepted to be the actual exit point, and the timer is therefore started with an initial value resulting in a timer start-time equal to the exit time. The exit time is found to be 193.0 seconds.

The above-mentioned embodiments use two lines to determine the exit time when an object starts descending from a flying object. In the first embodiment, the measured data are preprocessed by low-pass filtering, which enables detection of the exit time without succeeding validation. In the second embodiment, the measured data, that have not been preprocessed, are used in the detection of the exit time. As the data contain noise, e.g. measuring noise, a validation of the detected exit time is necessary. It should be mentioned that the validation can also be performed in the case where the data are preprocessed by a low-pass filter in order to increase the reliability of the detected exit time. A number of implementations containing various combinations of the above-mentioned two methods can be implemented depending on the field of application.

We claim:

1. A method for resetting a timer according to the exit time when an item starts descending from a flying object, comprising steps of continuously measuring and storing the values of the altitude of the item.

determining within a first and a second time interval the slope of respective first and second curve fractions, each curve fraction being defined by the measured altitude versus time.

continuously detecting the difference in slope values of the first and second curve fractions, and choosing the exit time as the time when the difference between said slopes exceeds a predetermined value.

2. A method according to claim 1, wherein the altitude is measured by pressure detection means.

3. A method according to claim 1 or 2, wherein the altitude is measured by position detection means.

4. A method according to claim 1, wherein the measured values of altitude are low-pass filtered before the slope of the respective curve fractions is calculated.

5. A method according to claim 1, wherein said curve fractions are straight lines found according to the method of linear regression.

6. A method according to claim 1 or 4, wherein the exit time is continuously verified by comparing the difference in slope values of the first curve fraction and a third curve fraction of altitude versus time defined within a third time interval which progresses according to the real time.

7. A method according to claim 1 or 4, wherein the exit time is continuously verified by supervision of the imaginary intersection of the first curve fraction and a third curve fraction of altitude versus time defined within a third time interval which progresses according to the real time.

8. A timer especially for use in connection with an item descending from a flying object and comprising means for registering the time elapsed since exit time when the item starts descending, detection means for measuring the altitude, first storage means for storing the values of the altitude, means for calculating within a first time interval the slope of a first curve fraction defined as altitude versus time, and means for calculating within a second time interval the slope of a second curve fraction defined as altitude versus time, and means for finding and showing the intersection point between said curve fractions, said intersection point defining the exit time.

9. A timer according to claim 8, wherein the detection means for measuring the altitude comprise air pressure detection means.

10. A timer according to claim 8 or 9, wherein the detection means for measuring the altitude comprise position detection means.

11. A timer according to claim 10, wherein the position detection means comprise a GPS satellite navigation receiver.

12. A timer according to claim 8, said timer further comprising low-pass filtering means for low pass filtering of the values of altitude before the slope of the respective curve fractions is calculated.

13. A timer according to claim 8, wherein said timer comprises means for verification of a stored intersection point, said means being responsive to the values of altitude of said first curve fraction and of a third curve fraction defined within a third time interval which progresses according to the real time.

14. A timer according to claim 13, and further comprising
second storage means for storing the slope information of the first curve fraction,
third storage means for storing the slope information of said third curve fraction, and
comparing means for continuously supervising the difference of the slope information of the first and third curve fractions, respectively.

15. A timer according to claim 13, and further comprising
fourth storage means for storing the information obtained from the intersection of the first and second curve fraction,
fifth storage means for storing the information obtained from the imaginary intersection of the first and the third curve fraction, and
comparing means for continuously supervising the mutual distances between the said intersections.

16. A timer according to claim 15, wherein said mutual comparing means are responsive to the measured time values.

17. A timer according to claim 15, wherein said mutual comparing means are responsive to the measured altitude values.

18. A timer according to claim 8, comprising means for finding the respective extension of said curve fractions in case said fractions do not intersect and for finding and showing the intersection point of said extensions.

* * * * *